(12) United States Patent
Hareyama et al.

(10) Patent No.: US 6,479,582 B1
(45) Date of Patent: Nov. 12, 2002

(54) RUBBER COMPOSITION

(75) Inventors: Yukiya Hareyama, Tokushima (JP); Hidetoshi Ogawa, Tokushima (JP)

(73) Assignee: Otsuka Chemical Co., Ltd., Osaka (JP)

( * ) Notice: Subject to any disclaimer, the term of this patent is extended or adjusted under 35 U.S.C. 154(b) by 0 days.

(21) Appl. No.: 09/424,130

(22) PCT Filed: Sep. 29, 1997

(86) PCT No.: PCT/JP97/03478

§ 371 (c)(1),
(2), (4) Date: Nov. 18, 1999

(87) PCT Pub. No.: WO98/53003

PCT Pub. Date: Nov. 26, 1998

(30) Foreign Application Priority Data

May 21, 1997 (JP) ............................................. 9-130611

(51) Int. Cl.[7] .............................. C08K 3/10; C08K 3/14; C08K 3/38

(52) U.S. Cl. ....................... 524/784; 524/785; 524/789; 524/847; 524/862; 524/925

(58) Field of Search .................................. 524/780, 783, 524/784, 785, 789, 779, 847, 862, 901, 925

(56) References Cited

U.S. PATENT DOCUMENTS 5,688,862 A * 11/1997 Kondou et al. ............. 524/780

FOREIGN PATENT DOCUMENTS

| EP | 0 719 730 A1 | * | 7/1996 | |
| --- | --- | --- | --- | --- |
| JP | 52-93452 | | 8/1977 | ............ C08K/9/02 |
| JP | 60-32854 A | | 2/1985 | ............ C09C/3/06 |
| JP | 61044709 | | 3/1986 | |
| JP | 61-255945 A | | 11/1986 | ............ C08L/21/00 |
| JP | 63-86205 | | 4/1988 | ............ H01B/1/20 |
| JP | 63215745 A | * | 9/1988 | ............ C08L/21/00 |
| JP | 64-85253 | | 3/1989 | ......... C08L/101/00 |
| JP | 4062713 | | 2/1992 | |
| JP | 4-091168 A | | 3/1992 | ............ C09C/3/08 |
| JP | 5-239261 | | 9/1993 | ............ C08K/9/04 |
| JP | 6183708 | | 7/1994 | |
| JP | 6-210631 A | | 8/1994 | ............ B29B/15/08 |
| JP | 8-127674 | | 5/1996 | ............ C08L/21/00 |

* cited by examiner

Primary Examiner—David W. Wu
Assistant Examiner—R. Harlan
(74) Attorney, Agent, or Firm—Olson & Hierl, Ltd.

(57) ABSTRACT

A rubber composition is obtained which exhibit improved strength, abrasion resistance and antistatic properties, as well as low rolling resistance.

The rubber composition is characterized as being rendered conductive by incorporating into rubber a silica filler having a conductive surface layer as composed of carbon or conductive tin oxide.

16 Claims, No Drawings

RUBBER COMPOSITION

TECHNICAL FIELD

The present invention relates to rubber compositions suitable for uses such as tires and belts.

BACKGROUND ART

Generally, a part of a rotational force applied to a tire mounted on an automobile and the like is converted to heat energy through a rolling resistance, leading to energy loss. Accordingly, the increased rolling resistance during running results in the substantial increase in fuel consumption of automobiles. Also, exhaust gases therefrom add to the environmental pollution. For such reasons, the society strongly demands reduction in rolling resistance of tires which have been used worldwide in large volumes.

Among a variety of fillers used in rubber compositions, the most important and widely-used filler is carbon black. The carbon black is particularly excellent in its ability to reinforce rubbers. This makes it an essential filler for tires, belts and the like which require sufficient strength, abrasion resistance and fatigue resistance. Furthermore, the carbon black itself is semiconductive—conductive and thus effective to impart conductivity to the otherwise insulative rubber.

However, the character of carbon black that adheres strongly to rubber increases rolling resistance of tires. This has led to the recent investigations which use silica in stead of carbon black.

Rubbers exhibit improved resistance to oil and acid when containing silica as a filler than when containing carbon black only. It has been also recognized that the silica-containing rubbers show the reduced resistance to repeated deformation as a result of lower hysteresis when deformed. Therefore, the silica-containing rubbers, when used in tires, are said to show reduced rolling resistance, relative to the rubber containing carbon black, to result in the increased fuel-efficiency and the reduced occurrence to pollute the environment.

Notwithstanding the above, the use of silica has been found to impose various problems that result from its non-conductive nature, as contrary to carbon black, which fails to impart antistatic properties to insulative materials such as rubber. For example, a danger of spark ignition during refueling may exist if static electricity produced in an automobile is accumulated therein without being discharged through a road surface. There is another problem of radio interference, such as a radio noise, which may be caused by the influence of the produced static electricity.

Various attempts have been made to solve such problems. For example, an attempt has been made to reduce rolling resistance by using rubber materials having low glass transition points, such as natural rubbers and cis-polybutadiene rubber, or alternatively, by controlling the type, amount or the like of the carbon black and softener used. However, the former shows a tendency to result in the marked reduction in wet skid resistance while the latter to result in the reduction in abrasion resistance. It has been thus difficult to satisfy all conditions simultaneously.

The combined use of carbon black and silica has also been contemplated. For antistatic purposes, the volume specific resistance must be maintained at a value of not exceeding $10^8$ $\Omega$.cm. This requires carbon black to be added to the composition in the amount of not lower than about 50% by weight. Such high loading of carbon black, while used in combination with silica, leads to the difficulty for silica to develop its characteristic properties, which is a problem.

Also, silica exists in various forms, e.g., contains water of crystallization or has a hydrophilic nature due to the presence of silanol groups at its particle surface, to thereby show poor "wettability" to rubber. This leads to its poor adhesion to rubber that may cause phase separation and the like to result in the reduction in strength and durability of the rubber composition.

In order to solve such silica-associated problems, a method is proposed which hydrophobates a silica filler surface by treatment with cold plasma (Japanese Patent Laid Open No. Sho 61-255945).

Also, an attempt has been made to modify surface properties of a silica filler by treating its surface with a mercapto silane coupling agent and the like.

Another attempt utilizes a combination of carbon black, silica and carbon fiber to form a conduction path (Japanese Patent Laid Open No. Hei 8-127674).

However, the above-described conventional methods have all suffered from the difficulty to simultaneously develop the respective benefits of carbon black and silica filler loaded in the rubber composition, because carbon black and silica filler have discrete surface properties and bonding strengths to rubber.

It is an object of the present invention to provide a rubber composition which can develop the respective benefits of carbon black and silica filler, which is excellent in strength, abrasion resistance and antistatic properties, and which exhibits low rolling resistance.

DISCLOSURE OF THE INVENTION

A rubber composition of the present invention is characterized as being rendered conductive by incorporating, into rubber, a silica filler having a conductive surface layer.

Due to the incorporation of the silica filler having a conductive surface layer, the rubber composition of the present invention has imparted thereto excellent strength, abrasion resistance and antistatic properties, as well as low rolling resistance.

A constitution of the rubber composition in accordance with the present invention is below explained in detail.

Rubber in the Rubber Composition

Examples of rubbers for use in the rubber composition of the present invention include natural and synthetic rubbers. Those natural and synthetic rubbers can be used alone or in combination.

Applicable natural rubbers include those generally used in the art. Modified rubbers, such as epoxidized natural rubbers, can also be employed for the natural rubber in the present invention.

Examples of synthetic rubbers include styrene-butadiene rubber, ethylene-propylene rubber, isoprene rubber, butadiene rubber, halogenated rubbers (chlorobutyl rubber, bromobutyl rubber and the like), silicone rubber, urethane rubber and the like. These may be used alone or in any combination of two or more types.

The above listing of specific rubbers is for exemplary purposes only, and is not intended to limit the present invention.

Silica Filler Having a Conductive Surface Layer

The silica filler having a conductive surface layer for use in the present invention may be a silica filler having on its surface a conductive layer, for example, composed of carbon or conductive tin oxide. The amount of conductive surface layer is preferably in the range of 0.1–50 parts by weight, more preferably 3–30 parts by weight, based on 100 parts by weight of the silica filler. If the amount of conductive surface layer is excessively small, sufficient conductivity may not be imparted to the rubber composition. On the other hand, if it is excessively large, the effect of addition of the silica filler to the rubber composition, i.e., the reduced rolling resistance, may not be obtained.

A blending proportion of the silica filler having a conductive surface layer (hereinafter referred to as "conductive silica filler") to rubber is preferably in the range of 5–80% by weight, more preferably in the range of 20–70% by weight. If the blended proportion of the conductive silica filler is excessively small, sufficient conductivity may not be obtained for the composition. On the other hand, if the blended proportion of the conductive silica filler is excessively large, its effectiveness shows little increase while the composition's physical properties remain satisfied. The blending proportion is accordingly maintained within the above-specified range.

Representative examples of silica fillers for use in the present invention are hydrated silica and unhydrated silica. However, any substance which is comprised principally of silica ($SiO_2$) moieties can be employed. The silica moieties need not be 100%.

The silica filler can be provided in various forms, such as particulate, amorphous, plate-like, needle-like and fibrous forms. The method used to synthesize the silica filler is not particularly limited, and includes a treatment which modifies silica-containing substances (both natural and artificially synthesized substances). An average particle size of silica fillers is preferably in the approximate range of 0.01–100 $\mu$m. In the case of fibrous silica fillers, an average fiber length is preferably in the approximate range of 1–100 $\mu$m with a preferred aspect ratio being in the approximate range of 3–100. A water content of the silica filler, while not particularly limited, is preferably in the approximate range of 0.01–15% by weight.

The conductive layer of the conductive silica filler may be composed of carbon or conductive tin oxide, as stated earlier. The conductive silica filler having the conductive carbon layer can be prepared by heating a silica filler in the presence of a hydrocarbon component under a non-oxidizing atmosphere to thermally decompose the hydrocarbon component so that the conductive layer of carbon is deposited on a surface of the silica filler.

The method used to deposit the conductive carbon layer on the silica filler surface is explained below.

As stated above, the conductive carbon layer can be deposited by heating the silica filler in the presence of a hydrocarbon component under a non-oxidizing atmosphere. The non-oxidizing atmosphere can be realized by introducing a reducing or inert gas. The reducing gas may be a hydrogen, ammonia or carbon monoxide gas, for example. The inert gas may be a nitrogen gas, but other possible substitutes include an argon, helium and xenon gas. Other types of reducing or inert gases can also be utilized. These gases can be used alone or in combination. It is generally preferred that such reducing or inert gases account for 95 or higher % of an interior volume of a reaction system.

The type of hydrocarbon component is not particularly limited, so long as it can produce carbons by thermal decomposition. Generally useful are gaseous substances composed of carbon and hydrogen atoms, or substances which when heated, can be rendered into a gaseous form via evaporation or sublimation. In addition to carbon and hydrogen atoms, applicable substances may further contain, in part, an oxygen, nitrogen or sulfur atom in a molecule. Specific examples of hydrocarbon components are aliphatic hydrocarbons and aromatic hydrocarbons. Examples of aliphatic hydrocarbons include saturated hydrocarbons as represented by a general formula $C_nH_{2n+2}$ (wherein n is an integer from 1 to 20), hyrocarbons of ethylene series as represented by a general formula $C_nH_{2n}$ (wherein n is the same as described above), and hyrocarbons of acetylene series as represented by a general formula $C_nH_{2n-2}$ (wherein n is the same as described above). Examples of aromatic hydrocarbons include benzene, toluene, xylene and their homologues; polycyclic aromatic hydrocarbons such as naphthalene and anthracene; and halides of the above-listed various types of hydrocarbons. These hydrocarbons can be used alone or in any combination.

The carbon production via the above-described thermal decomposition of the hydrocarbon component under the non-oxidizing atmosphere can be achieved by heating the coexisting hydrocarbon component in a calcining furnace, preferably in a rotary calcining furnace which stirs by rotation the silica fillers accommodated therein.

A heating temperature is preferably in the approximate range of 30° C.–1,200° C. An illustrated heating period is 10 minutes–120 minutes.

For the purpose of removing a moisture contained in the silica filler in advance, the silica filler may be heat treated independently prior to being subjected to the above-described conductive layer forming step.

The silica filler on which the conductive layer has been previously formed may be subjected either to a heat treatment under a non-oxidizing atmosphere to remove by-products, or again to the conductive layer forming step. These treatments serve to impart the improved conductivity.

Rubber compositions containing silica fillers having such a conductive carbon layer have imparted thereto reduced rolling resistance, increased conductivity and excellent antistatic properties. They also exhibit excellent abrasion resistance and wet skid resistance.

The procedure to form the conductive tin oxide layer will be now explained.

Besides tin oxide, the conductive tin oxide layer may preferably contain one or more metallic dopant selected from the group consisting of antimony, indium and niobium. These metallic dopants may be contained preferably in the range of 0.1–20% by weight, more preferably in the range of 0.3–5% by weight. If a metallic dopant content is excessively low, its doping effect relative to tin oxide may be reduced to result in the failure to obtain high conductivity. If the metallic dopant content is excessively high, the conductive tin oxide layer, while adequate in conductivity, may be colored grayish or bluish to thereby decrease in whiteness. Also, the excessively high content generally adds to cost, and is not preferred from an economical point of view.

The aforementioned conductive tin oxide layer may be formed on the silica filler, for example, by the method in which a tin compound and a metallic dopant compound, in solution conditions, are added to an aqueous dispersion of silica fillers to allow the tin compound and metallic dopant compound to deposit in their insoluble forms on surfaces of the silica fillers, followed by separation for subsequently subjecting to heat treatment so that a conductive layer composed substantially of tin oxide is provided. In general, the insoluble products of tin compound and metallic dopant compound are allowed to deposit via hydrolysis. Hydrolysis can be caused to proceed by using a variety of methods which include, for example, (1) a method wherein the tin and metallic dopant compounds, as provided in the form of organic compounds such as alcoholates and acetylacetonates, are dissolved in a water-soluble organic medium for addition to the aqueous dispersion of silica fillers, (2) a method wherein the tin and metallic dopant compounds, as provided in the form of halides, are dissolved in alcohols for addition to the aqueous dispersion of silica fillers, and (3) a method wherein the tin and metallic dopant compounds are dissolved in water for addition to the aqueous dispersion of silica fillers.

Subsequent to deposition of the insoluble substance on their surfaces, the silica fillers are separated by such means as filtration, decantation or centrifuging, washed with water, dried and subjected to heat treatment. As a result, the silica fillers having the conductive tin oxide layer on their surfaces can be obtained. A heat treatment temperature, while not particularly limited, is preferably in the range of 200–1,000° C., more preferably in the range of 400–800° C.

Rubber compositions containing silica fillers bearing such a conductive tin oxide layer have imparted thereto reduced rolling resistance, as well as excellent antistatic properties due to their increased conductivity. Also, due to the whiteness of the silica fillers having the conductive tin oxide layer, rubber compositions incorporating such silica fillers can be colored to provide a decorative effect.

Rubber compositions containing silica fillers having the conductive carbon layer exhibit excellent properties, such as in strength, abrasion resistance, wet skid resistance and antistatic properties, as well as exhibiting reduced rolling resistance. Therefore, the conductive silica filler for use in the present invention is considered to be an ideal filler for incorporation into rubber, and the present rubber composition incorporating such fillers is particularly suitable for use in tires, belts and the like.

BEST MODES FOR CARRYING OUT THE INVENTION

The present invention is hereinafter explained in detail by referring to specific examples.

SAMPLE PREPARATION EXAMPLE 1

So-called white carbon ("NIPSIL AQ", name used in trade and manufactured by Nippon Silica Kogyo Co., Ltd., average primary particle size of 16 $\mu$m, average secondary particle size of 200 $\mu$m) was used as a silica filler. In a rotary-type continuous heating furnace, a system interior was sufficiently nitrogen-substituted to reduce an oxygen concentration to 0.3 or lower % by volume, and then heated to 900° C. under the flow of a gaseous mixture of nitrogen and propane in a volumetric ratio of 10:1 (nitrogen gas:propane gas), so that the propane gas was thermally decomposed to result in the deposition of conductive carbon layer on a surface of the silicon filler. The amount of conductive carbon layer deposited was 20 parts by weight, based on 100 parts by weight of the aforementioned white carbon.

SAMPLE PREPARATION EXAMPLE 2

The above-described Sample Preparation Example 1 was followed, except that the system interior was heated to 1,000° C., to such treat NIPSIL AQ white carbon as to deposit a conductive carbon layer on its surface. The amount of conductive carbon layer deposited was 25 parts by weight, based on 100 parts by weight of the white carbon.

SAMPLE PREPARATION EXAMPLE 3

Wollastonite (fibrous calcium silicate "R-RIMGLOS", named in trade and manufactured by Nyco Minerals Inc., Ltd.) was dispersed in water, treated with a carbon dioxide gas and further with an acid to remove a calcium content in the fiber, so that a fibrous silica having a silica ($SiO_2$) content of not less than 97% by weight was obtained. The fibrous silica revealed an average fiber length of 20 $\mu$m and an aspect ratio of 40. The fibrous silica thus obtained was used as a silica filler. The same installation and procedure as in the preceding Sample Preparation Examples 1 and 2 were utilized, except that a gaseous hydrocarbon source was changed from propane to toluene (gasified by exposure to heat) and that the heat treating temperature of the system interior was set at 1,000° C. Heat decomposition of the toluene gas resulted in deposition of a conductive carbon layer on a surface of the fibrous silica. For the conductive fibrous silica obtained, the amount of conductive layer deposited was 25 parts by weight, based on 100 parts by weight of the fibrous silica.

SAMPLE PREPARATION EXAMPLE 4

NIPSIL AQ, white carbon used in Sample Preparation Examples 1 and 2, was dispersed in water and heated to 70° C. A mixed solution of stannous chloride and antimony chloride in hydrochloric acid, together with a solution of sodium hydroxide in water, were added with agitation to the aqueous dispersion separately but concurrently. A pH of the reaction system was kept in an acidic range. After the reaction was terminated, the reaction product was filtered, washed with water, dried, and heat treated at 700° C. for 1 hour. As a result of the above procedure, a conductive layer composed of stannous oxide/antimony oxide was deposited on a surface of the white carbon as a silica filler. The stannous oxide contained 20% by weight of antimony oxide. The deposit amount of conductive layer composed of stannous oxide and antimony oxide was 40 parts by weight, based on 100 parts by weight of the silica material.

Each of the conductive silica fillers obtained in the aforementioned Sample Preparation Examples 1–4 was added in proportions as indicated in Table 1 to emulsion polymerized styrene-butadiene copolymer rubber (SRB-1712) and then mixed in a Banbury mixer to prepare a rubber composition. As indicated in Table 1, besides the conductive silica fillers, a silane coupling agent and a process oil were further added. For comparative purposes, rubber compositions were also prepared according to a recipe shown in Table 1. Silica used was NIPSIL AQ, and carbon black used was N339 manufactured by Showa Cabot Co., Ltd. The carbon fiber used in Comparative Example 3 was a vapor-deposited carbon fiber (product name "GLASSKER", product of Nikkiso Co., Ltd., average diameter of 0.6 $\mu$m).

The rubber compositions obtained in the manner as stated above were measured for processability, as well as for wet skid resistance, rolling resistance, abrasion resistance and volume resistance when they were used in tire treads, according to the following procedures.

Processability

The Moony viscosity $ML_{1+4}$ (100° C.) was measured according to JIS K-6300. The measured values of up to 80 were regarded as being indicative of good processability (marked ◯), while the measured values of larger than 80 were regarded as being indicative of poor processability (marked x).

Wet Skid Resistance

A wet road surface was prepared by spreading water across a surface of SAFETY WALK (Type B) manufactured by Sumitomo 3M Corp. The frictional resistance relative to the wet road surface was measured using a portable skid tester manufactured by Stanley Co., Ltd., Great Britain, according to the method described in Rubber Chemical and Technology, Vol. 38, page 840. In evaluating the wet skid resistance, the measured values were standardized by taking the value measured in Comparative Example 1 as 100. The larger the value, the better the wet skid resistance.

Rolling Resistance

A 2 mm thick, 5 mm by 5 mm square sample was subjected to measurement of shear loss tangent (tan δ) at 60° C. under conditions of 50 Hz and 5% shear under a viscoelastic spectrometer manufactured by Iwamoto Seisakusho Co., Ltd. As useful indicators in evaluating the rolling resistance, the measured values were standardized by taking the value measured in Comparative Example 1 as 100. The smaller the value, the lower the rolling resistance.

Abrasion Resistance

A Lambourn abrasion tester, manufactured by Shimata Giken Co., Ltd., was employed to measure the abrasion loss at a slipping ratio of 60% under a load of 3 Kg, according to JIS K-6264. As useful indicators in evaluating the abrasion resistance, the measured values were standardized by taking the value measured in Comparative Example 1 as 100. The larger the value, the better the abrasion resistance.

Volume Resistance Value

A sample piece was interposed between two electrodes and a DC voltage was applied across the sample piece. An electric current flowing through the sample piece was measured to calculate a volume resistance value (numerical value obtained by dividing the voltage by the current through a unit volume of the sample piece).

These results are together shown in Table 1.

TABLE 1

| | Exp. 1 | Exp. 2 | Exp. 3 | Exp. 4 | Comp. Exp. 1 | Comp. Exp. 2 | Comp. Exp. 3 | Comp. Exp. 4 |
|---|---|---|---|---|---|---|---|---|
| SBR 1712 | 100 | 100 | 100 | 100 | 100 | 100 | 100 | 100 |
| Sample Prep. Ex. 1 | 70 | | | | | | | |
| Sample Prep. Ex. 2 | | 70 | | | | | | |
| Sample Prep. Ex. 3 | | | 70 | | | | | |
| Sample Prep. Ex. 4 | | | | 70 | | | | |
| Silica | | | | | | 40 | 40 | 70 |
| Carbon Black | | | | | 70 | 30 | 20 | |
| Carbon Fiber | | | | | | | 10 | |
| Si-69* | 3 | 3 | 3 | 3 | 3 | 3 | 3 | 3 |
| Process Oil | 30 | 30 | 30 | 30 | 30 | 30 | 30 | 30 |
| Processability | ○ | ○ | ○ | ○ | ○ | ○ | ○ | ○ |
| Wet Skid Resistance | 110 | 111 | 112 | 92 | 100 | 96 | 95 | 92 |
| Rolling Resistance | 90 | 89 | 89 | 91 | 100 | 96 | 97 | 90 |
| Abrasion Resistance | 105 | 106 | 106 | 97 | 100 | 97 | 98 | 91 |
| Volume Resistance Value (Ω.cm) | $10^5$ | $10^4$ | $10^4$ | $10^7$ | $10^5$ | $10^6$ | $10^7$ | $10^{13}$ |

*: Si-69 = Silane Coupling Agent Manufactured by DEGUSSA A. G.

As evident from the results shown in Table 1, the rubber compositions of Example 1–Example 4 in accordance with the present invention enjoy excellent processability and exhibit improved wet skid resistance and abrasion resistance, as well as low rolling resistance. They also exhibit low levels of volume specific resistance which demonstrate their excellent antistatic properties.

Capability of Exploitation in Industry

The rubber composition of the present invention have improved strength, abrasion resistance, wet skid resistance and antistatic properties, as well as low rolling resistance, which make it very suitable for uses such as tires and belts. Because of its excellence in wet skid resistance, abrasion resistance and conductivity, the rubber composition of the present invention is also applicable for use as flooring. Because of its high strength and conductivity, the rubber composition of the present invention can also be utilized as damping rubber for use as an automotive part and the like.

What is claimed is:

1. A tire comprising a conductive rubber composition which contains a silica filler having a conductive surface layer which comprises carbon, the silica filler being present in the composition in an amount sufficient to render the tire conductive and to provide reduced rolling resistance.

2. The tire as recited in claim 1, wherein said silica filler having the conductive layer is present in an amount of 5–80% by weight.

3. The tire as recited in claim 1, wherein said conductive surface layer is deposited on the silica filler in the amount by weight of 0.1–50 parts, based on 100 parts of the silica filler.

4. The tire as recited in claim 1, wherein said silica filler is white carbon.

5. A tire comprising a conductive rubber composition which contains a silica filler having a conductive surface layer, the silica filler being present in the composition in an amount sufficient to render the tire conductive and to provide reduced rolling resistance, and wherein said silica filler is white carbon and said conductive surface layer comprises tin oxide.

6. The tire as recited in claim 5, wherein said silica filler having the conductive surface layer is present in an amount of 5–80% by weight.

7. The tire as recited in claim 5, wherein said conductive surface layer is deposited on the silica filler in an amount by weight of 0.1–50 parts, based on 100 parts of the silica filler.

8. A belt comprising a conductive rubber composition which contains a silica filler having a conductive surface layer which comprises carbon, the silica filler being present in the composition in an amount sufficient to render the belt conductive and to provide reduced volume specific resistance.

9. The belt as recited in claim 8, wherein said silica filler having the conductive surface layer is present in an amount of 5–80% by weight.

10. The belt as recited in claim 8, wherein said conducive surface layer is deposited on the silica filler in an amount by weight of 0.1–50 parts, based on 100 parts of the silica filler.

11. The belt as recited in claim 8, wherein said silica filler is white carbon.

12. A belt comprising a conductive rubber composition which contains a silica filler having a conductive surface layer, the silica filler being present in the composition in an amount sufficient to render the tire conductive and to provide reduced rolling resistance, and wherein said silica filler is white carbon and said conductive surface layer comprises tin oxide.

13. The belt as recited in claim 12, wherein said silica filler having the conductive layer is incorporated in the amount of 5–80% by weight.

14. The belt as recited in claim 12, wherein said conductive layer is deposited on the silica filler in the amount by weight of 0.1–50 parts, based on 100 parts of the silica filler.

15. A tire comprising a conductive rubber composition which contains as filler white carbon having a conductive surface layer, said filler being present in the composition in an amount sufficient to render the tire conductive and to provide reduced rolling resistance.

16. A belt comprising a conductive rubber composition which contains as filler white carbon having a conductive surface layer, the filler being present in the composition in an amount sufficient to render the belt conductive and to provide reduced volume specific resistance.

* * * * *